United States Patent
Ogami

(10) Patent No.: US 6,397,696 B2
(45) Date of Patent: Jun. 4, 2002

(54) AUTOMATIC GEAR TRANSMISSION

(75) Inventor: Shiro Ogami, Kariya (JP)

(73) Assignee: Aisin Ai Co., Ltd., Nishio (JP)

( * ) Notice: Subject to any disclaimer, the term of this patent is extended or adjusted under 35 U.S.C. 154(b) by 0 days.

(21) Appl. No.: 09/731,926

(22) Filed: Dec. 8, 2000

(30) Foreign Application Priority Data

Dec. 8, 1999 (JP) .......................................... 11-348968

(51) Int. Cl.[7] .............................................. F16H 59/04
(52) U.S. Cl. ...................................................... 74/335
(58) Field of Search ...................... 74/335, 336, 336 R, 74/473.12; 477/906

(56) References Cited

U.S. PATENT DOCUMENTS

| | | | | |
|---|---|---|---|---|
| 5,419,412 A | * | 5/1995 | Schwab et al. | 180/336 |
| 5,823,053 A | * | 10/1998 | Stengel et al. | 74/335 |
| 5,966,989 A | * | 10/1999 | Reed et al. | 74/331 |
| 5,970,811 A | * | 10/1999 | Imao et al. | 74/325 |
| 6,145,398 A | * | 11/2000 | Bansbach et al. | 477/76 |
| 6,220,108 B1 | * | 4/2001 | Huggins et al. | 74/336 R |
| 6,295,884 B1 | * | 10/2001 | Miyake et al. | 74/335 |

FOREIGN PATENT DOCUMENTS

| | | |
|---|---|---|
| EP | 0 129 632 | 1/1985 |
| EP | 0 422 444 | 4/1991 |
| EP | 0 592 170 | 4/1994 |
| GB | 2 156 456 | 10/1985 |

* cited by examiner

Primary Examiner—Rodney H. Bonck
Assistant Examiner—David D. Le
(74) Attorney, Agent, or Firm—Burns, Doane, Swecker & Mathis, LLP

(57) ABSTRACT

A gear-shift mechanism for a gear transmission in which a shift-and-select lever on a changeover shaft is loaded by a compression spring assembled therewith toward an initial position where the shift-and-select lever is brought into engagement with a shift head for $1^{st}$–$2^{nd}$ speeds for selectively establishing first or second speed gear train, and in which in the occurrence of a failure in any one of a selection-stroke sensor and a shift-stroke sensor, a second actuator is deactivated under control of an electric controller to permit free movement of the changeover shaft in an axial direction and a second actuator is activated under control of the electric controller to effect rotary movement of the changeover shaft so that the shift-and-select lever is moved to the initial position under the load of the compression spring and brought into engagement with the shift head to establish first or second speed gear train.

4 Claims, 7 Drawing Sheets

AUTOMATIC GEAR TRANSMISSION

BACKGROUND OF THE INVENTION

1. Field of the Invention

The present invention relates to an automatic gear transmission adapted for use in automotive vehicles, and more particularly to a gear-shift mechanism for the gear transmission.

2. Description of the Prior Art

In recent year, there has been proposed a gear-shift mechanism for a gear transmission of the type which includes a changeover shaft mounted within a housing of the gear transmission for both axial and rotary movements to be axially shifted from a neutral position to a forward or reverse position in selecting operation and to be rotated at its shifted position in shifting operation, a shift-and-select lever fixed to an intermediate portion of the changeover shaft for axial and rotary movement therewith, an interlock member rotatably mounted in place on the changeover shaft and having a pair of interlock arms located at the opposite sides of the shift-and-select lever, detent means for restricting rotary movement of the interlock member and for permitting axial movement of the interlock member, a plurality of fork shafts mounted in parallel within the housing for axial movement in a shift direction perpendicular to the changeover shaft, a plurality of shift forks mounted on the fork shafts to be selectively engaged with each sleeve of a plurality of changeover mechanisms for selectively establishing a plurality of change-speed gear trains in the gear transmission, a plurality of shift heads mounted on the fork shafts to be selectively engaged with the shift-and-select lever at their neutral positions, a first actuator operatively connected to the changeover shaft for effecting rotary movement of the changeover shaft when activated under control of an electric controller, a shift-stroke sensor for detecting the operation of the first actuator, a second actuator operatively connected to the changeover shaft for effecting axial movement of the changeover shaft when activated under control of the electric controller, and a selection-stroke sensor for detecting the operation of the second actuator.

In such a gear transmission as described above, if a failure occurs in any one of the stroke sensors during travel of an automotive vehicle, it becomes impossible for the electric controller to determine whether a desired speed gear train has been correctly established or not. This causes an error in operation of the electric controller. For this reason, it is preferable that the electric controller is designed to stop the vehicle in the occurrence of a failure in any one of the stroke sensors for safety of the driver and to avoid unexpected trouble caused by an error in its operation. On the other hand, it is required to design the gear-shift mechanism in such a manner that the vehicle can be started to drive to a repair shop after stopped under control of the electric controller.

SUMMARY OF THE INVENTION

It is, therefore, a primary object of the present invention to provide a gear-shift mechanism capable of starting the vehicle in a safety condition in the occurrence of a failure in any one of the stroke sensors.

According to the present invention, the object is accomplished by providing a gear-shift mechanism for a gear transmission of the type which includes a changeover shaft mounted within a housing of the gear transmission for both axial and rotary movements to be axially shifted from a neutral position to a forward or reverse position in selecting operation and to be rotated at its shifted position in shifting operation, a shift-and-select lever fixed to an intermediate portion of the changeover shaft for axial and rotary movements therewith, an interlock member rotatably mounted in place on the changeover shaft and having a pair of interlock arms located at the opposite sides of the shift-and-select lever, detent means for restricting rotary movement of the interlock member and for permitting axial movement of the interlock member, a plurality of fork shafts mounted in parallel within the housing for axial movement in a shift direction perpendicular to the changeover shaft, a plurality of shift forks mounted on the fork shafts to be selectively engaged with each sleeve of a plurality of changeover mechanisms for selectively establishing a plurality of change-speed gear trains in the gear transmission, a plurality of shift heads mounted on the fork shafts to be selectively engaged with the shift-and-select lever at their neutral positions, a first actuator operatively connected to the changeover shaft for effecting rotary movement of the changeover shaft when activated under control of an electric controller, a shift-stroke sensor for detecting the operation of the first actuator, a second actuator operatively connected to the changeover shaft for effecting axial movement of the changeover shaft when activated under control of the electric controller, and a selection-stroke sensor for detecting the operation of the second actuator, wherein the shift-and-select lever is loaded by resilient means assembled therewith toward an initial position in which the shift-and-select lever is brought into engagement with one of the shift heads for establishing a low speed gear train, and wherein in the occurrence of a failure in at least one of the selection-stroke sensor and the shift-stroke sensor, the second actuator is deactivated under control of the electric controller to permit free movement of the changeover shaft in an axial direction and the first actuator is activated under control of the electric controller to effect rotary movement of the changeover shaft so that the shift-and-select lever is moved to the initial position under the load of the resilient means and brought into engagement with the one of the shift heads to establish the low speed gear train.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
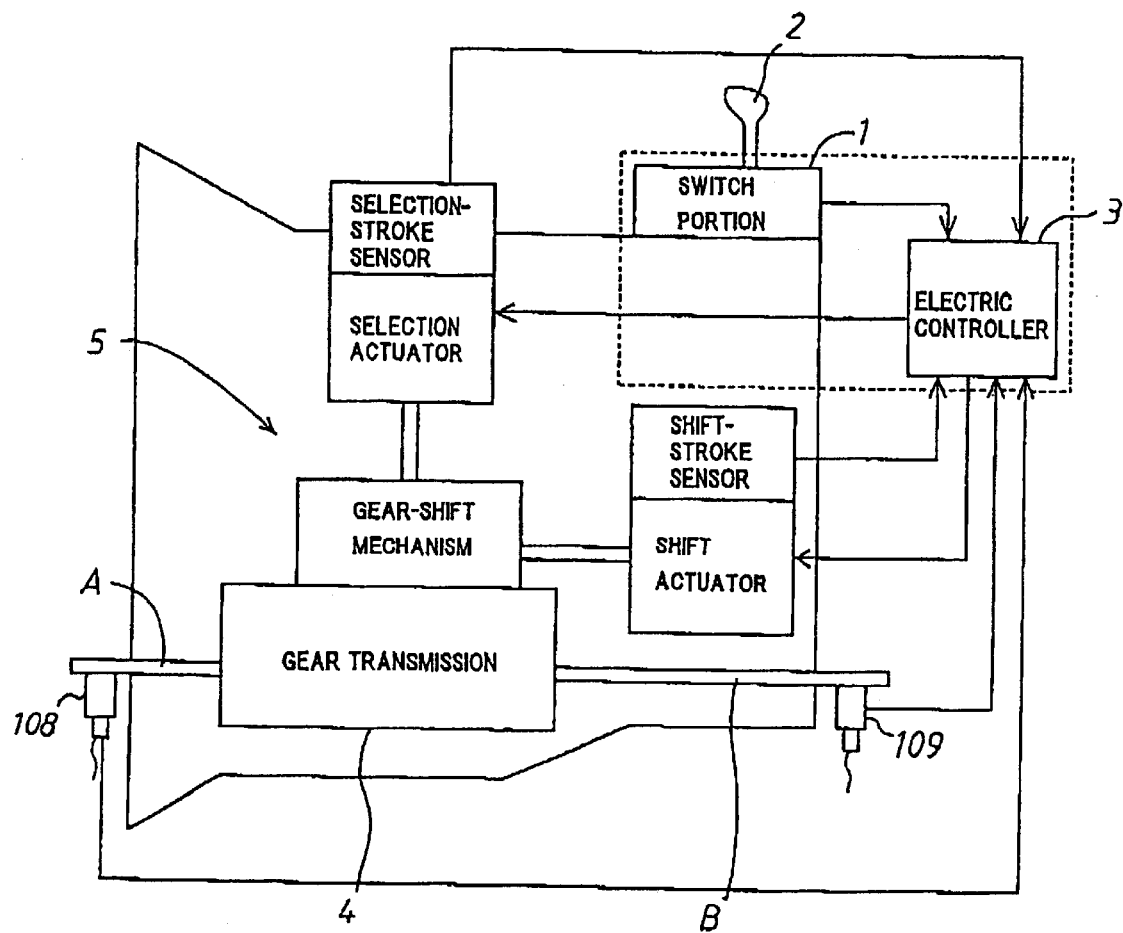
FIG. 1 is a block diagram showing the whole components of an automatic gear transmission in accordance with the present invention.
Figure 2:
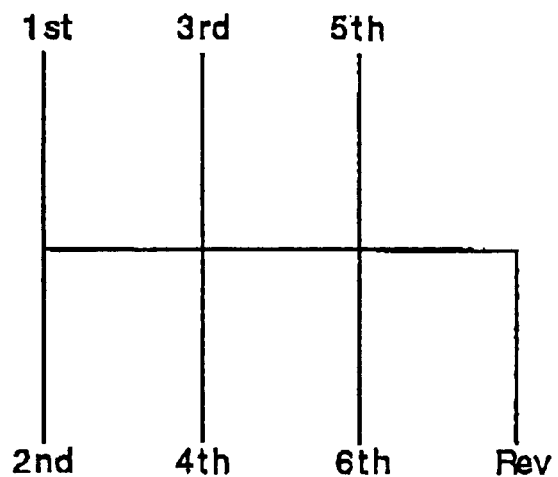
FIG. 2 illustrates a shift-pattern of a gear-shift mechanism in the gear transmission.

In FIG. 1 of the drawings, there is schematically illustrated the whole components of an automatic gear transmission adapted for use in an automotive vehicle in accordance with the present invention. In FIG. 1, the reference numeral 1 designates a switch portion of detecting a change-speed gear train selected by operation of a manual shift lever 2 and for applying a signal indicative of the selected gear train to an electric controller 3 for control of the gear transmissions The shift lever 2 is supported in place to be shifted by a driver in a shift-pattern shown in FIG. 2. The reference numeral 4 designates the gear transmission with change-speed gear trains of forward six steps and a reverse step which are changed over by means of a gear-shift mechanism 5.

Figure 3:
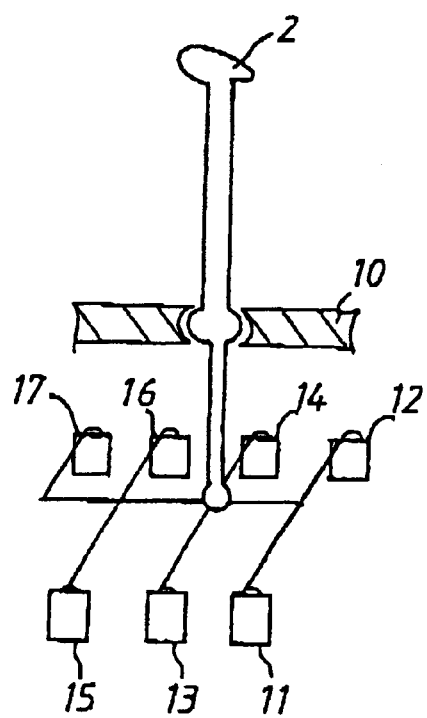
FIG. 3 is a schematic illustration of a mounting construction of a manual shift lever.

As shown in FIG. 3, the shift lever 2 is mounted on a housing 10 of the gear transmission. The reference numeral 11–17 designates a group of switches mounted within the housing 10 and opposed to a lower end of the shift lever 2. The switches 11–17 are connected to the electric control circuit 3. When the shift lever 2 is selectively shifted to $1^{st}$ to $6^{th}$ speed positions of the shift pattern shown in FIG. 2, the switches 11–16 are selectively turned on by engagement with the lower end of shift lever 2. When the shift lever 2 is shifted to a reverse position of the shift pattern, the switch 17 is turned on by engagement with the lower end of shift lever 2. Thus, when the shift lever 2 is shifted in accordance with a driving condition of the vehicle, a selected gear train is detected by on-operation of either one of the switches 11–17, and a signal indicative of the selected gear train is applied to the electric controller 3.

Figure 4:
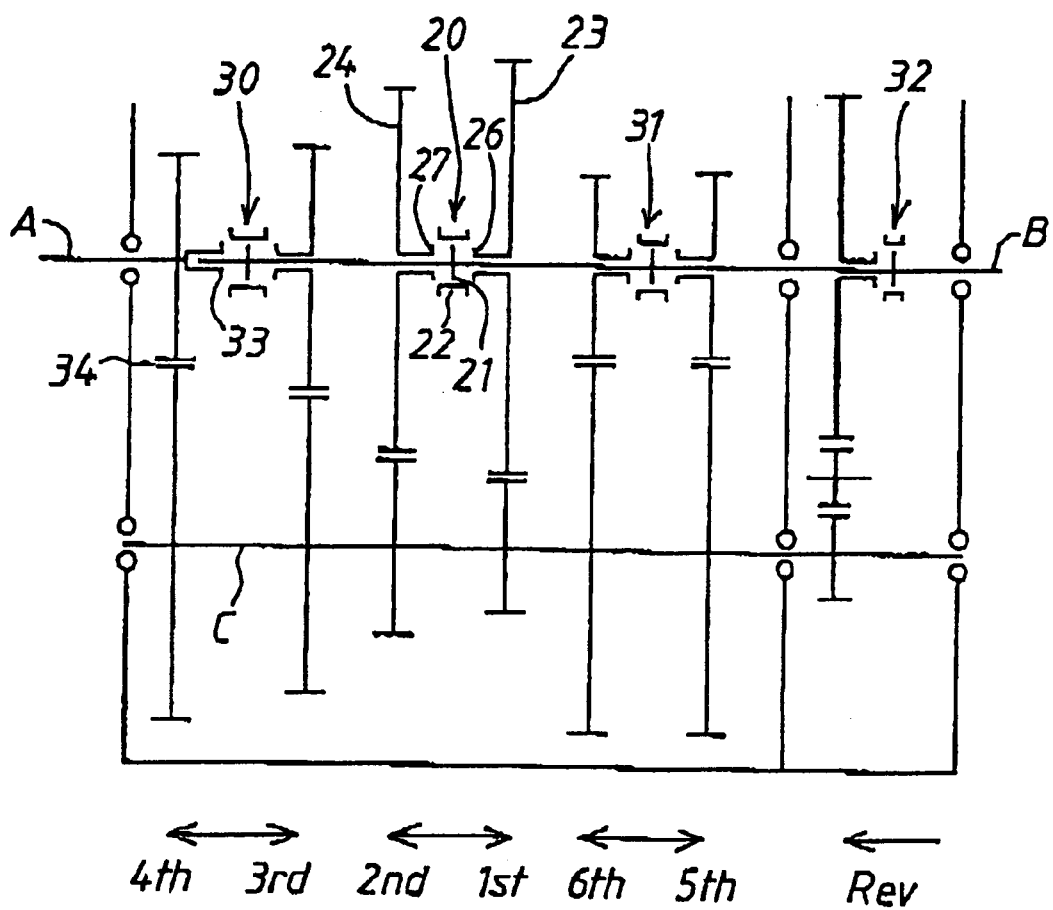
FIG. 4 is a skeleton view illustrating change-speed gear trains in the gear transmission.

As shown in FIG. 4, the gear transmission 4 includes a changeover mechanism 20 in which a sleeve 22 is coupled with a hub member 21 fixed to an output shaft B for reciprocal movement in an axial direction. First and second speed gears 23, 24 are rotatably mounted on the output shaft B at opposite sides of the hub member 21 and positioned in place for transmitting a drive power from an input shaft A to the output shaft B. When shifted to a right-hand first speed position, the sleeve 22 is brought into engagement with a clutch gear 26 fixed to the first speed gear 23 through a syuchronizer (not shown) to establish a first speed gear train. When shifted to a left-hand second speed position, the sleeve 22 is brought into engagement with a clutch gear 27 fixed to the second speed gear 24 through a synchronizer (not shown) to establish a second speed gear train. When retained in a neutral position, the sleeve 22 is disengaged from the clutch gears 26 and 27 to disconnect the output shaft B from the first and second speed gears 23 and 24. Each sleeve of changeover mechanisms 30 and 31 is mounted on the output shaft B in the same manner as in the changeover mechanism 20 to selectively establish a third or fourth speed gear train and to selectively establish a fifth or sixth speed gear train. Similarly, a sleeve of a changeover mechanism 32 is mounted on the output shaft B to establish a reverse gear train.

When the sleeve of the changeover mechanism 30 for third and fourth speed gears is shifted to a left-hand fourth speed position, the sleeve is brought into engagement with a clutch gear 33 fixed to the input shaft A to establish a direct drive connection between the input and output shafts A and B. A gear train 34 is provided for drive connection between the input shaft A and a counter shaft C. Except for the fourth speed, the rotation of input shaft A is transmitted to the output shaft B through the gear train 34, counter shaft C and the corresponding changeover mechanism.

Figure 5:
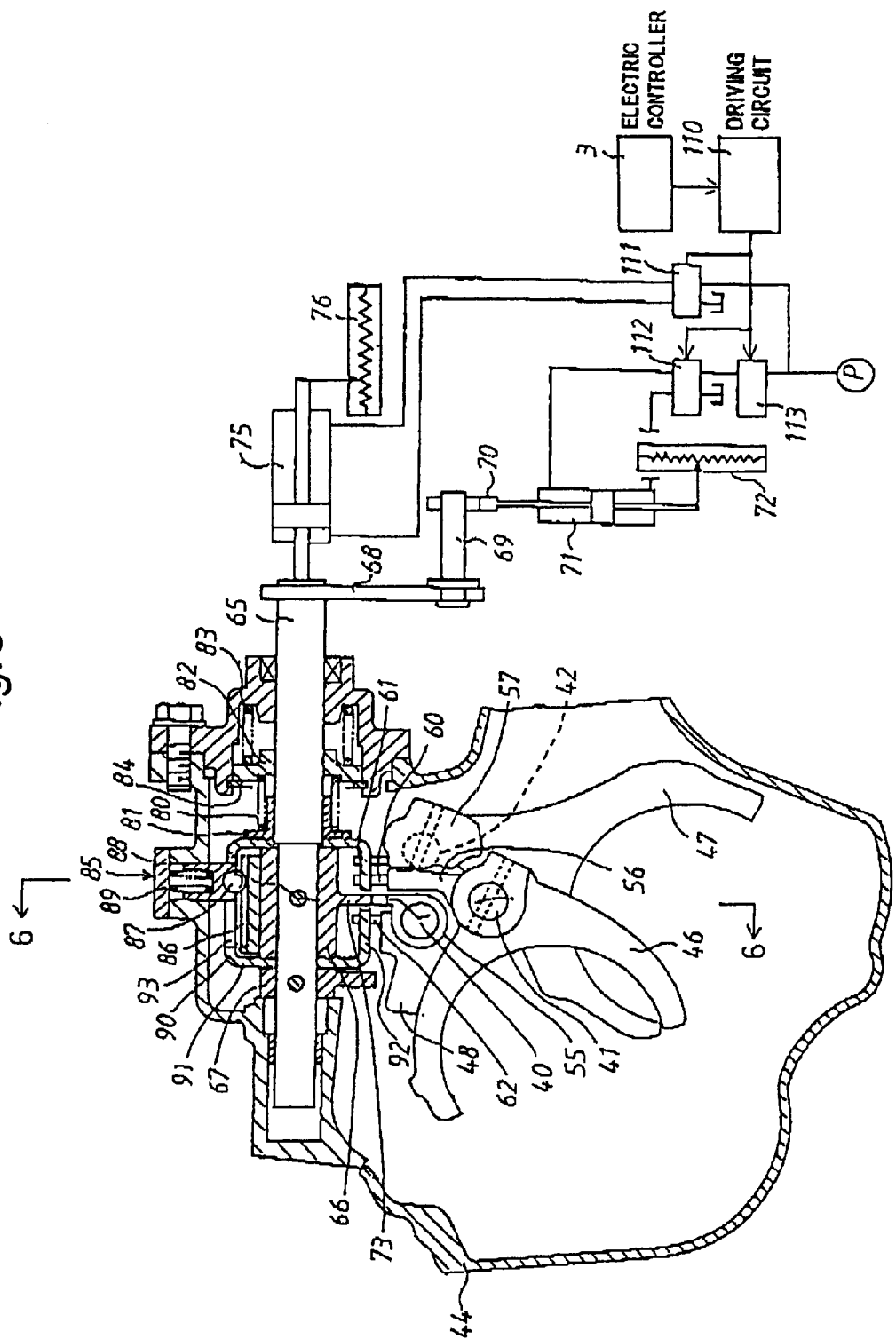
FIG. 5 is a vertical sectional view of the gear-shift mechanism.
Figure 6:
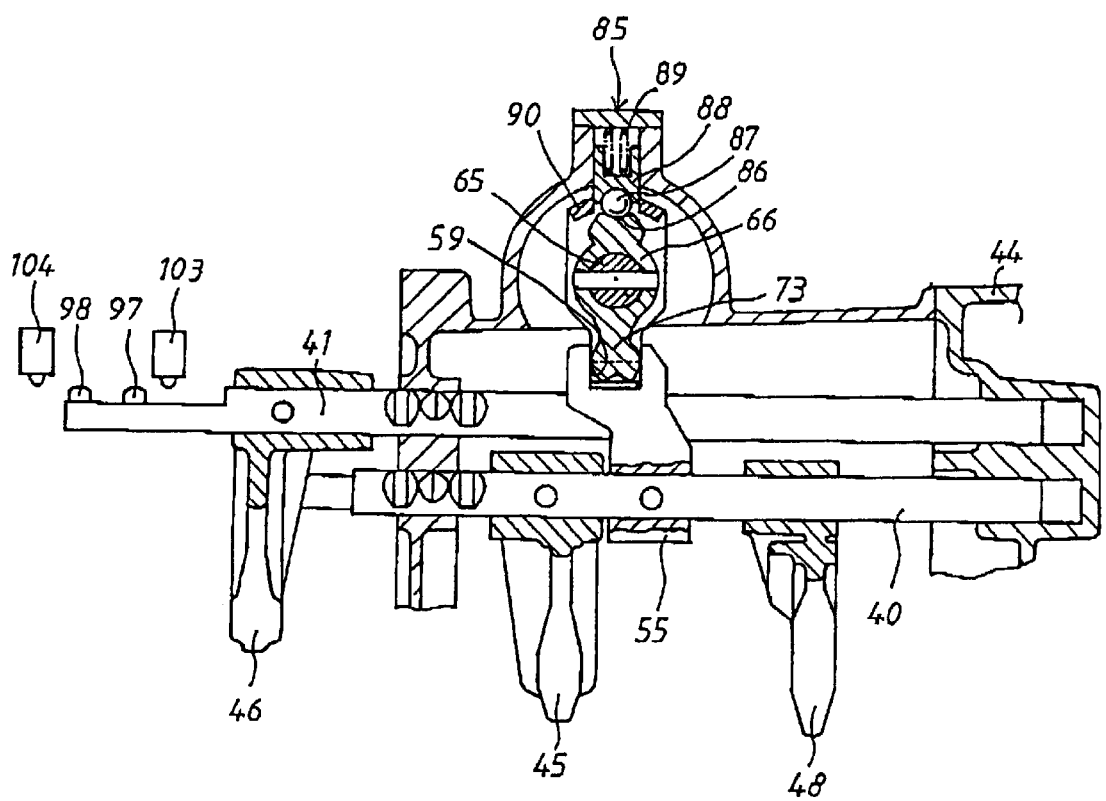
FIG. 6 is a sectional view taken along line 6—6 in FIG. 5.
Figure 7:
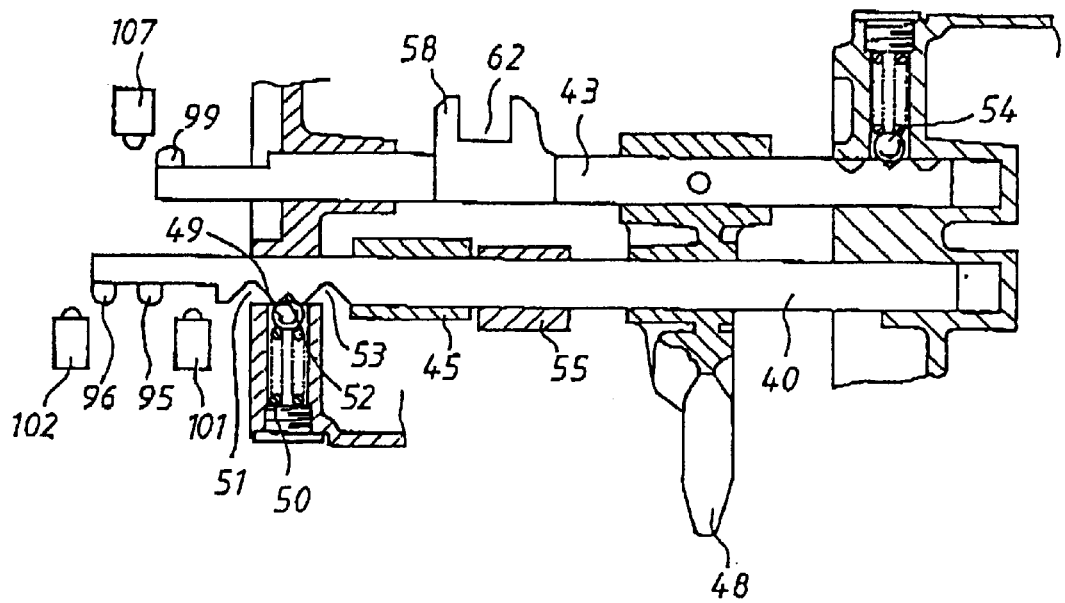
FIG. 7 is a sectional view taken along a fork shaft for $1^{st}$–$2^{nd}$ speeds in the gear-shift mechanism.

As shown in FIGS. 5 to 7, the gear-shift mechanism 5 includes a fork shaft 40 for $1^{st}$–$2^{nd}$ speeds, a fork shaft 41 for $3^{rd}$–$4^{th}$ speeds, a fork shaft 42 for $5^{th}$–$6^{th}$ speeds and a fork shaft 43 for reverse drive which are mounted in parallel to each other within an upper portion 44 of the gear transmission housing 10. As shown in FIG. 6, a shift fork 45 for $1^{st}$–$2^{nd}$ speeds is fixed to the fork shaft 40 and maintained in engagement with an annular groove formed on the sleeve 22 of the changeover mechanism 20 to selectively shift the sleeve 22 to the first speed, neutral and second speed positions. As shown in FIG. 7, the for shaft 40 is formed with recesses 51–53 which are selectively engaged with a detent ball 49 loaded by a coil spring 50 when the fork shaft 40 is selectively shifted to the first speed, neutral and second speed positions. Similarly, shift forks 46 and 47 for $3^{rd}$–$4^{th}$ speeds and for $5^{th}$–$6^{th}$ speeds are respectively fixed to the fork shafts 41 and 42 and maintained in engagement with each annular groove formed on the sleeves of the changeover mechanisms 30 and 31 to selectively shift the sleeves to the third speed, neutral and fourth speed positions and to fifth speed, neutral and sixth speed positions. The fork shafts 41 and 42 are retained in their shifted positions by means of a detent mechanism (not shown) as in the fork shaft 40. As shown in FIG. 7, a shift fork 48 for reverse drive is fixed to the fork shaft 43 and slidably supported by the fork shaft 40 for $1^{st}$–$2^{nd}$ speeds. The shift fork 48 is engaged with an annular groove formed on the sleeve of the changeover mechanism 32. The fork shaft 43 is retained in its shifted position by means of a detent mechanism 54.

Shift heads 55–58 are fixed to the fork shafts 40–43 respectively. The shift heads 55–58 are formed with recessed portions 59–62 respectively which are selectively brought into engagement with a shift-and-select lever 66. When all the fork shafts 40–43 are retained in their neutral positions, the recessed portions 59–62 of shift heads 55–58 are aligned in a select direction perpendicular to the fork shafts 40–43.

A changeover shaft 65 is mounted within the upper portion 44 of the gear transmission housing 10 for both axial and rotary movements and is placed in the select direction. The shift-and-select lever 66 and a lever 67 for reverse drive are fixed to the changeover shaft 65 and located at the backside of the shift forks 45–48. A drive arm 68 is fixed at one end thereof to a rear end of the changeover shaft 65 and at the other end thereof to a drive shaft 69 arranged in parallel with the changeover shaft 65. A drive fork 70 is maintained in engagement with the drive shaft 69 and is moved by a hydraulic actuator 72 to effect rotary movement of the changeover shaft 65. When the changeover shaft 65 is rotated by the drive fork 70, an arm 73 of the shift-and-select lever 66 and the lever 67 for reverse drive are moved in a shift direction parallel with the fork shafts 40–43 to be selectively retained at their low-speed, neutral and high-speed positions. Thus, a shift-drive mechanism is composed of the changeover shaft 65, drive arm 68, drive shaft 69, drive fork 70 and hydraulic actuator 71 for shifting the arm 73 of shift-and-select lever 66 in the shift direction. A shift-stroke sensor 72 is provided as a shift-stroke detection means to detect a displaced position of the piston of hydraulic actuator 71 and to detect a shifted position of the arm 73 of shift-and-select lever 66. An output of the shift-stroke sensor 72 is applied as a feedback signal to the electric controller 3 through an A–D converter (not shown).

A hydraulic actuator 75 is connected to the rear end of changeover shaft 65 to move the arm 73 of shift-and-select lever 66 in the select direction. In a condition where all the fork shafts 40–43 are retained in their neutral positions, the recessed portions 59–62 of shift heads 55–58 are aligned in the select direction to permit the movement of the arm 73 of shift-and-select lever 66 in the select direction. In such a condition, the changeover shaft 65 is moved by activation of the hydraulic actuator 75 to bring the arm 73 of shift-and-select lever 66 selectively into engagement with any one of the recessed portions 59, 60 and 61 of shift heads 55–57. Thus, a select-drive means is composed of the changeover shaft 65 and hydraulic actuator 75 for shifting the arm 73 of shift-and-select lever 66 in the select direction. A selection-stroke sensor 76 is provided as a selection-stroke detection means to detect a displaced position of the piston of hydraulic actuator 75 and to detect a shifted position of the arm 73 of shift-and-select lever 66. An output of the selection-stroke sensor 76 is applied as a feedback signal to the electric control circuit 3 through an A–D converter (not shown).

A compression spring 80 is disposed between a retainer 81 slidably mounted on the changeover shaft 65 and an annular member 82 slidably mounted within a support block assembled with the upper portion 44 of the gear transmission housing 10. The annular member 82 is loaded leftward by a compression spring 83 stronger than the compression spring 80 and retained in place by abutment with an annular stopper 84 fixed to the support block. In a condition where the hydraulic actuator 75 is deactivated, the changeover shaft 65 is loaded leftward by the compression spring 80 so that the lever 67 for reverse drive is retained in place by abutment with an inner wall of the upper portion 44 of the gear transmission housing 10 and that the arm 73 of shift-and-select lever 66 is engaged with the recessed portion 59 of shift head 55 fixed to the fork shaft 40 for $1^{st}$–$2^{nd}$ speeds. When the hydraulic actuator 75 is activated to move the changeover shaft 65 rightward against the load of compression spring 80, the arm 73 of shift-and-select lever 66 is successively brought into engagement with the recessed portions 60, 61 of shift heads 56, 57 fixed to the fork shafts 41, 42 for $3^{rd}$–$4^{th}$ speeds and for $5^{th}$–$6^{th}$ speeds. When the changeover shaft 65 is further moved against the load of compression spring 80 after the retainer 81 was engaged with the annular member 82, the lever 67 for reverse drive is brought into engagement with the recessed portion 62 of shift head 58 fixed to the fork shaft 43 for reverse drive.

A detent mechanism 85 for retaining the shift-and-select lever 66 in its neutral position includes a detect ball 87 in engagement with an axial groove 86 formed on the backside of shift-and-select lever 66 in the select direction, a holder 88 slidably mounted within the upper portion 44 of the gear transmission housing 10 for retaining the detent ball 87 in place, and a coil spring 89 provided to bias the detent ball 87 toward the backside of shift-and-select lever 66 through the holder 88. An interlock member 90 is formed to contain the shift-and-select 66 and is mounted in placed on the changeover shaft 65 to selectively restrict shift movements of the shift heads 55–57. The interlock member 90 is integrally formed at the lower portion thereof with a pair of interlock arms 92 which are located at the opposite sides of shift-and-select lever 66 to be brought into engagement with the shift heads 55–57. The interlock member 90 is formed at the upper portion thereof with an axial hole 93 in which the bolder 88 of detect mechanism 85 extends to restrict rotary movement of the interlock member 90 and to permit axial movement of the interlock member 90 in the select direction.

Figure 8:
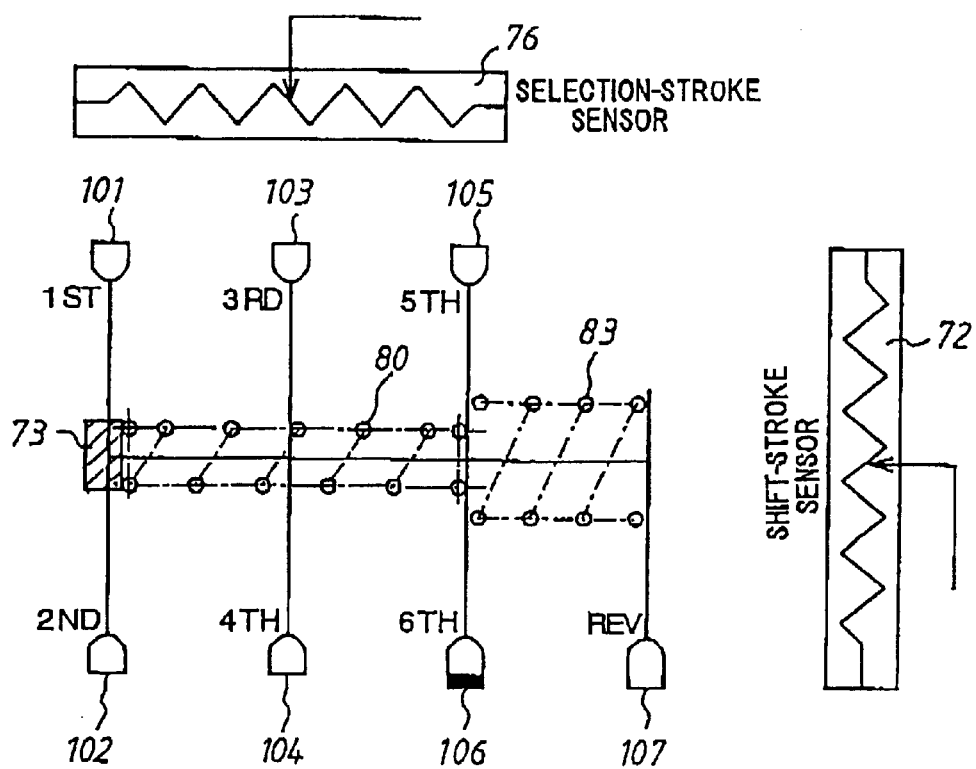
FIG. 8 is a schematic illustration of the components of the gear-shift mechanism.

As shown in FIG. 7, the fork shaft 40 for $1^{st}$–$2^{nd}$ speeds is provided at one end thereof with axially spaced dogs 95 and 96 which are selectively brought into engagement with positions switches 101 and 102 when the shift fork 45 is shifted to the first speed position or the second speed position. As shown in FIG. 6, the fork shaft 41 for $3^{rd}$–$4^{th}$ speeds is provided at one end thereof with axially spaced dogs 97 and 98 which are selectively brought into engagement win position switches 103 and 104 when the shift fork 46 is shifted to the third speed position or the fourth speed position. Similarly, the fork shaft 42 for $5^{th}$–$6^{th}$ speeds is provided at one end thereof with axially spaced dogs which are selectively brought into engagement with position switches 105 and 106 (shown in FIG. 8) when the shift fork 47 is shifted to the fifth speed position or the sixth speed position. As shown in FIG. 7, the fork shaft 43 for reverse drive is provided at one end thereof with a dog 99 which is brought into engagement with a position switch 107 when the shift fork 48 is shifted to the reverse position. Illustrated in FIG. 8 is the arrangement of position switches 101, 102; 103, 104; 105, 106; and 107 in relation to the stroke sensors 72 and 76.

Assuming that the shift lever 2 has been shifted to the fifth speed position, the switch 15 is turned on by engagement with the lower end of shift lever 2. When applied with an output signal from the switch 15, the electric controller 3 activates a driving circuit 110 to control a changeover valve 111 in such a manner that the hydraulic actuator 75 is operated to move the changeover shaft 65 rightward in the select direction thereby to bring the arm 73 of shift-and-select lever 66 into engagement with the recessed portion 61 of shift head 57. In this instance, the shifted position of the arm 73 of shift-and-select lever 66 is detected by the selection-stroke sensor 76, and a signal indicative of the detected position is applied as a feedback signal to the electric controller 3 through the A–D converter. Thus, the arm 73 of shift-and-select lever 66 is accurately engaged with the recessed portion 61 of shift head 57. When the arm 73 of shift-and-select lever 66 is engaged with the recessed portion 61 of shift head 57, the driving circuit 110 is activated under control of the electric controller 3 to control a control valve 112 in such a manner that the hydraulic actuator 71 is operated to rotate the changeover valve 65 thereby to shift the arm 73 of shift-and-select lever 66 to the low-speed side. Thus, the shift head 57, fork shaft 42 and shift fork 47 are moved to shift the sleeve of the changeover mechanism 31 to the fifth speed position. The fact that the gear transmission 4 is in the fifth speed condition is confirmed by on-operation of the position switch 105 caused by engagement with the dog fixed to the fork shaft 42 for $5^{th}$–$6^{th}$ speeds.

Figure 9:
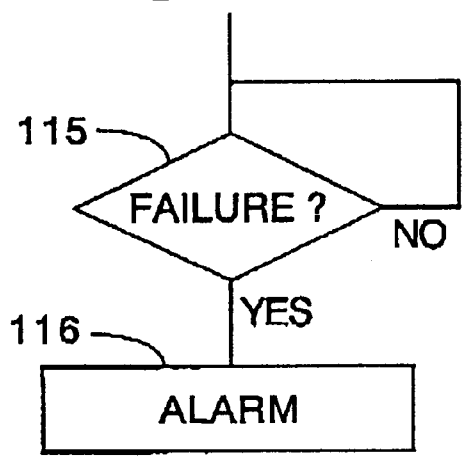
FIGS. 9(a) and 9(b) show a flow chart of a program for control of the gear-shift mechanism.
Figure 9:
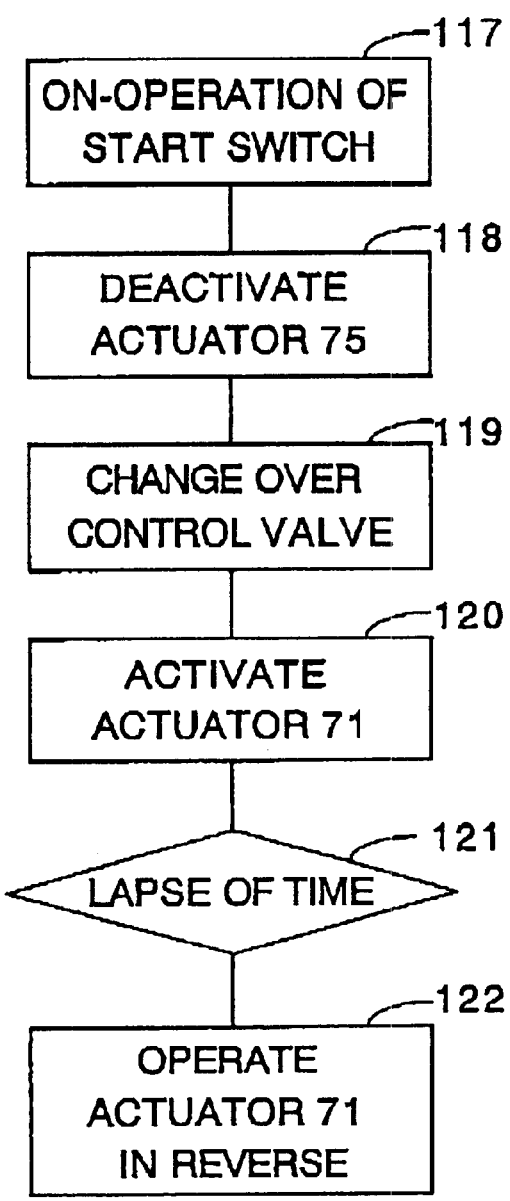

As shown in FIG. 9(a), the electric controller 3 determines at step 115 as to whether or not any failure occurs in the gear-shift mechanism during travel of the vehicle. When determined a failure in the gear-shift mechanism, the electric controller 3 issues at step 116 an alarm signal and an instruction signal for stopping the vehicle. Assuming that the shift-stroke or selection stroke sensor 72 or 76 is out of order in a condition where the position switch 105 has been turned on during travel of the vehicle at the fifth speed, the detection signal of stroke sensor 72 or 76 does not correspond with the signal indicative of the fifth speed. In such an instance, the failure of stroke sensor 72 or 76 is determined by the electric controller 3. In the occurrence of failure in any one of the position switches 101–107, a difference between change-speed steps detected by the position switch and the stroke sensors 72, 76 is determined by the electric controller 3.

When it is desired to drive the vehicle to a repair shop after stopping due to failure in the gear-shift mechanism a start switch (not shown) is turned on by the driver. In response to on-operation of the start switch, the control circuit 3 controls the gear-shift mechanism at step 117 shown in FIG. 9(b) to establish the first speed gear train in the gear transmission as follows. In this instance, the driving circuit 110 is activated under control of the electric controller 3 at step 118 to control the changeover valve 111 in such a manner that both the fluid chambers of hydraulic actuator 75 are connected to a reservoir to permit free movement of the changeover shaft 65. Subsequently, the driving circuit 110 is activated under control of the electric controller 3 at step 119 and 120 to control the control valves 113 and 112 in such a manner that the hydraulic actuator 71 is operated at a low speed to rotate the arm 73 of shift-and-select lever 66 with the changeover shaft 65 toward the high-speed side at least in a predetermined distance defined by half space between the low and high speed sides. As a result, the arm 73 of shift-and-select lever 66 is aligned with the recessed portions 60, 59 of shift heads 56, 55 placed in their neutral positions, and in turn, the changeover shaft 65 is moved to the initial position under the load of compression spring 80. Thus, the arm 73 of shift-and-select lever 66 is brought into engagement with the recessed portion 59 of shift head 55 corresponding with the shift fork 45 for $1^{st}$–$2^{nd}$ speeds to shift the fork shaft 40 for $1^{st}$–$2^{nd}$ speeds toward the low speed side in the predetermined distance. When determined at step 121 lapse of a time during which the arm 73 of shift-and-select lever 66 is moved in the predetermined distance, the electric controller 3 activates the driving circuit 110 to operate the hydraulic actuator 71 in such a manner that the arm 73 of shift-and-select lever 66 is moved toward the low speed side in the predetermined distance at a low speed. As a result, the shift fork 45 for $1^{st}$–$2^{nd}$ speeds is moved to the first speed position to shift the sleeve of the changeover mechanism 20 to the first speed position thereby to establish the first speed gear train in the gear transmission 4 for start of the vehicle. In this instance, the switch 101 is turned on by engagement with the dog 95 fixed to the fork shaft 40 for $1^{st}$–$2^{nd}$ speeds.

Assuming that the start switch is turned on after the vehicle has stopped due to a failure in the gear-shift mechanism during travel at the sixth speed, the hydraulic actuator 71 is operated under control of the electric controller 3 to move the arm 73 of shift-and-select lever 66 toward the high-speed side in the predetermined distance at a low speed. In this instance, the arm 73 of shift-and-select lever 66 does not move since it is already located at the high-speed side. Thus, when determined lapse of a time during which the arm 73 of shift-and-select lever 66 moved in the predetermined distance, the electric controller 3 causes the hydraulic actuator 71 to operate in reverse so that the arm 73 of shift-and-select lever 66 moves in a distance between the low-speed side and high-speed side at a low speed. As a result, the arm 73 of shift-and-select lever 66 is aligned with the recessed portions 60, 59 of shift heads 56, 55 and in turn, the changeover shaft 65 is moved to the initial position under the load of compression spring 80 to bring the arm 73 of shift-and-select lever 66 into engagement with the recessed portion 59 of shift head 55 corresponding with the shift fork 45 for $1^{st}$–$2^{nd}$ speeds. After engaged with the recessed portion 59 of shift head 55, the arm 73 of shift-and-select lever 66 is moved by the hydraulic actuator 71 to shift the shift fork 45 for $1^{st}$–$2^{nd}$ speeds to the low-speed side to establish the first speed gear train in the gear transmission so that the vehicle can be started.

Although in the foregoing embodiment, the arm 73 of shift-and-select lever 66 is moved in the predetermined distance defined by the half space between the low-speed side and the high-speed side when the start switch is turned on, the arm 73 of shift-and-select lever 66 may be moved at least in the distance between the low-speed side and the high-speed side. In such an instance, the first speed gear train is established in the gear transmission after the second speed gear train was established. Thus, the position switch 102 is turned on by engagement with the dog 96 fixed to the fork shaft 40 for $1^{st}$–$2^{nd}$ speeds. This is useful to confirm the occurrence of a failure in the gear-shift mechanism at the second speed.

What is claimed is:

1. A gear-shift mechanism for a gear transmission including a changeover shaft mounted within a housing of the gear transmission for both axial and rotary movements to be axially shifted from a neutral position to a forward or reverse position in selecting operation and to be rotated at its shifted position in shifting operation, a shift-and-select lever fixed to an intermediate portion of the changeover shaft for axial and rotary movements therewith, an interlock member rotatably mounted in place on the changeover shaft and having a pair of interlock arms located at the opposite sides of the shift-and-select lever, detent means for restricting rotary movement of the interlock member and for permitting axial movement of the interlock member, a plurality of fork shafts mounted in parallel within the housing for axial movement in a shift direction perpendicular to the changeover shaft; a plurality of shift forks mounted on the fork shafts to be selectively engaged with each sleeve of a plurality of changeover mechanisms for selectively establishing a plurality of change-speed gear trains in the gear transmission, a plurality of shift heads mounted on the fork shafts to be selectively engaged with the shift-and-select lever at their neutral positions, a first actuator operatively connected to the changeover shaft for effecting rotary movement of the changeover shaft when activated under control of an electric controller, a shift-stroke sensor for detecting the operation of the first actuator, a second actuator operatively connected to the changeover shaft for effecting axial movement of the changeover shaft when activated under control of the electric controller, and a selection-stroke sensor for detecting the operation of the second actuator, wherein said shift-and-select lever is loaded by resilient means assembled therewith toward an initial position in which said shift-and-select lever is brought into engagement with one of said shift heads for establishing a low speed gear train, and wherein in the occurrence of a failure in at least one of said selection-stroke sensor and said shift-stroke sensor, said second actuator is deactivated under control of said electric controller to permit free movement of said changeover shaft in an axial direction and said first actuator is activated under control of said electric controller to effect rotary movement of said changeover shaft so that said shift-and-select lever is moved to the initial position under the load of said resilient means and brought into engagement with the one of said shift heads to establish the low speed gear train.

2. A gear-shift mechanism as claimed in claim 1, wherein a position switch is provided to detect a shifted position of at least one of said fork shafts by engagement therewith for detecting a failure in any one of said stroke sensors in relation to the detected position.

3. A gear-shift mechanism for a gear transmission including a changeover shaft mounted with a housing of the gear transmission for both axial and rotary movements to be axially shifted from a neutral position to a forward or reverse position in selecting operation and to be rotated at its shifted position in shifting operation, a shift-and-select lever fixed to an intermediate portion of the changeover shaft for axial and rotary movements therewith, an interlock member rotatably mounted in place on the changeover shaft and having a pair of interlock arms located at the opposite sides of the shift-and-select lever, detent means for restricting rotary movement of the interlock member and for permitting axial movement of the interlock member, a plurality of fork shafts mounted in parallel within the housing for axial movement in a shift direction perpendicular to the changeover shaft, shift forks for $1^{st}$–$2^{nd}$ speeds, $3^{rd}$–$4^{th}$ speeds and $5^{th}$–$6^{th}$ speeds mounted on the fork shafts to be selectively engaged with each sleeve of a plurality of changeover mechanisms for selectively establishing first to sixth speed gear trains in the gear transmission, shift heads for $1^{st}$–$2^{nd}$ speeds, $3^{rd}$–$4^{th}$ speeds and $5^{th}$–$6^{th}$ speeds mounted on the fork shafts to be selectively engaged with the shift-and-select lever at their neutral positions, a first actuator operatively connected to the changeover shaft for effecting rotary movement of the changeover shaft when activated under control of an electric controller, a shift-stroke sensor for detecting the operation of the first actuator, a second actuator operatively connected to the changeover shaft for effecting axial movement of the changeover shaft when activated under control of the electric controller, and a selection-stroke sensor for detecting the operation of the second actuator, wherein said shift-and-select lever is loaded by resilient means assembled therewith toward an initial position in which said shift-and-select lever is brought into engagement with said shift head for $1^{st}$–$2^{nd}$ speeds for selectively establishing first and second speed gear trains, and wherein in the occurrence of a failure in at least one of said selection-stroke sensor and said shift-stroke sensor, said second actuator is deactivated under control of said electric controller to permit free movement of said changeover shaft in an axial direction and said first actuator is activated under control of said electric controller to effect rotary movement of said changeover shaft so that said shift-and-select lever is moved to the initial position under the load of said resilient means and brought into engagement with said shift head for $1^{st}$–$2^{nd}$ speeds to establish the first or second speed gear train.

4. A gear-shift mechanism as claimed in claim 1, wherein a plurality of position switches are provided to detect a shifted position of each of said fork shafts by engagement therewith for detecting a failure in any one of said stroke sensors in relation to the detected position.

\* \* \* \* \*